UNITED STATES PATENT OFFICE.

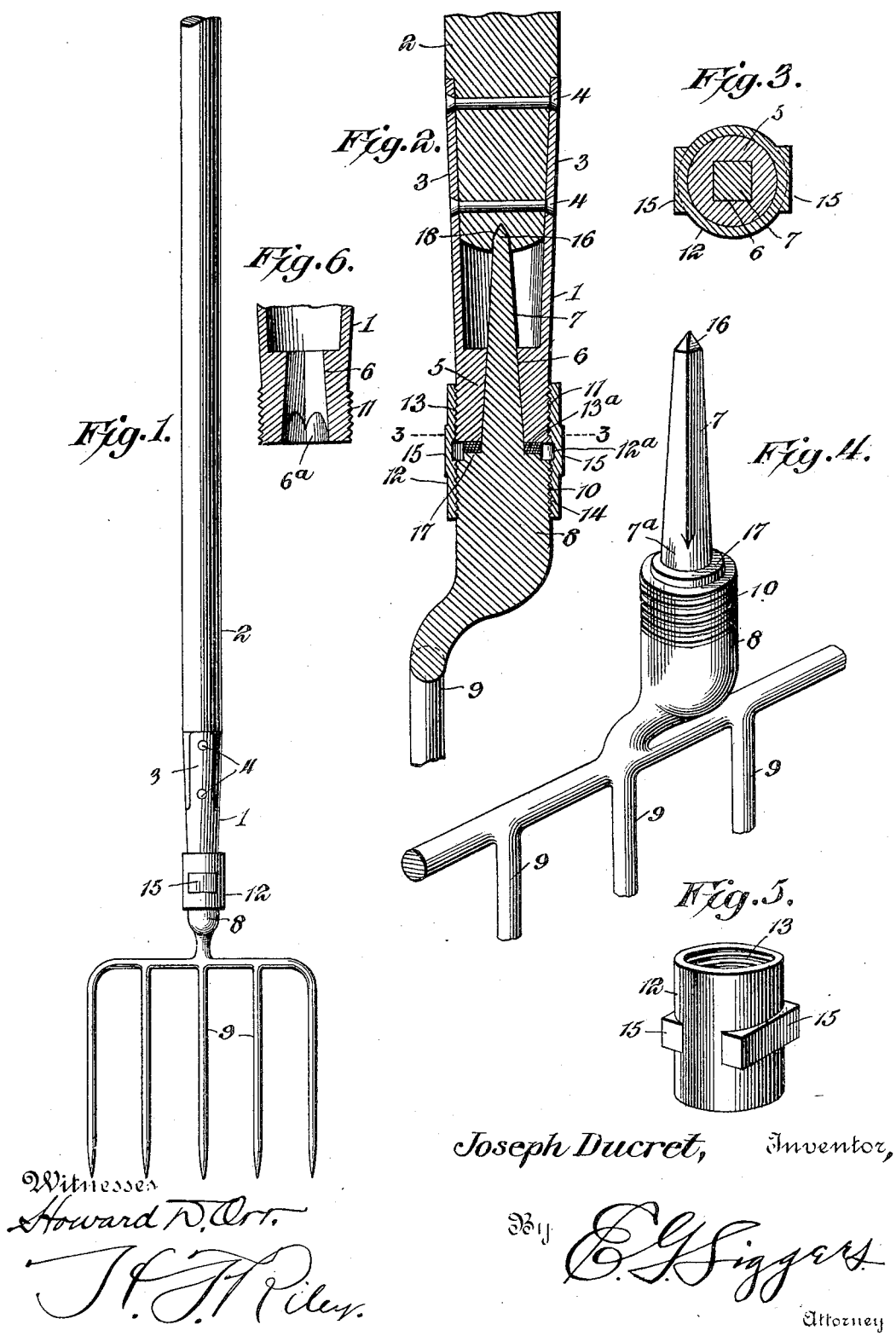

JOSEPH DUCRET, OF READING, KANSAS.

HAY-FORK.

No. 794,172.    Specification of Letters Patent.    Patented Aug. 29, 1905.

Application filed May 31, 1905. Serial No. 263,123.

*To all whom it may concern:*

Be it known that I, JOSEPH DUCRET, a citizen of the United States, residing at Reading, in the county of Lyon and State of Kansas, have invented a new and useful Hay-Fork, of which the following is a specification.

This invention relates to improvements in hay-forks.

The object of the present invention is to improve the construction of hay-forks, more especially the means for connecting the tines with the handle, and to provide a simple, inexpensive, and efficient device adapted to permit the tines of a hay-fork to be readily detached, so that different styles of forks may be applied to the same handle.

A further object of the invention is to provide a hay-fork which will enable a part to be readily replaced should it become broken and in which the parts when assembled will be tightly clamped and effectually prevented from becoming accidentally loose.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a plan view of a hay or pitch fork constructed in accordance with this invention. Fig. 2 is an enlarged detail sectional view illustrating the construction for detachably connecting the tines with the handle of the fork. Fig. 3 is a transverse sectional view on the line 3 3 of Fig. 2. Fig. 4 is a detail perspective view of the shank of the tines. Fig. 5 is a similar view of the coupling sleeve or nut. Fig. 6 is a detail sectional view of the outer end of the ferrule or socket.

Like numerals of reference designate corresponding parts in all the figures of the drawings.

1 designates a ferrule or socket adapted to receive one end of a hay or pitch fork handle 2 and having integral strips or extensions 3, which are secured by rivets 4 or other suitable fastening devices to the handle. The ferrule or socket is tapered slightly, and it is provided with a substantially solid outer portion 5, having an inwardly-tapered polygonal opening 6, which is preferably square in cross-section and which is adapted to receive a tapered portion or wedge 7 of a shank 8. The outer portion $6^a$ of the socket is rounded, so as to prevent weakening the outer end of the ferrule or socket by forming corner-recesses thereat. By this construction the walls of the outer end of the ferrule or socket are of the same thickness throughout. The heavy outer portion 5 extends a sufficient distance from the outer end of the ferrule to provide a socket of sufficient strength for engagement with the wedge-shaped extension 7 of the shank 8.

The shank 8, which is formed integral with the tines 9 of the fork, is rounded at the inner end $7^a$ of the tapered portion or wedge 7 to fit the rounded portion $6^a$ of the socket, and the said shank is also provided with an outer round portion or shank proper having exterior screw-threads 10. The outer end of the ferrule is also provided with exterior screw-threads 11, and these threads 10 and 11 of the shank and the ferrule are designed to be right and left hand threads and are engaged by a coupling sleeve or nut 12, which is adapted to draw the parts tightly together, whereby the tapered extension or wedge 7 will be firmly engaged with the tapered socket of the outer portion of the ferrule. The nut or sleeve, which has right and left hand threads 13 and 14 for engaging those of the socket and the shank, is provided at its center with an interiorly-arranged annular groove $12^a$, forming a smooth or unthreaded portion to permit either the socket or the shank to project beyond the inner ends of the threaded portions of the coupling sleeve or nut. This will prevent the socket or shank from interfering with the proper clamping action of the parts should one be started into the coupling sleeve or nut before the other. Instead, however, of forming the groove in the coupling sleeve or nut the ends of the socket and the round portion or shank proper may be grooved or cut away to prevent one part from coming in contact with the threads of the coupling sleeve or nut for engaging the other part. The coupling sleeve or nut is provided with exterior wrench-receiving faces 15, preferably consisting of flattened enlargements or bosses, as clearly shown in Fig. 5 of the drawings; but the sleeve or nut may be constructed in any desired manner and one or more wrench-receiving-faces may be employed. One or more washers $13^a$ are designed to be interposed between the shoulder formed at the inner end of the wedge and the outer end of the ferrule, and when the parts are assembled a solid structure is provided and the threads are concealed and are thereby prevented from being bruised or otherwise injured when the fork is in use.

The end 16 of the extension or wedge-shaped portion 7 is preferably seated in a recess 18 of the handle 2, as shown in Fig. 2 of the drawings. The round portion of the shank is reduced at 17 adjacent to the tapered extension or wedge-shaped portion 7.

The coupling for connecting the shank with the handle will permit the parts to be readily separated when it is desired to change the size or style of the tines, and in event of the breakage of any one of the parts the same may be removed without injuring the other parts. Different kinds of fork-heads having tines varying both in size and form may be provided for a single handle and may be quickly applied to and removed from the same. The device is light, strong, and durable and the fork cannot be easily broken or otherwise injured.

Having thus fully described my invention, what I claim as new, and desire to secure by Letters Patent, is—

1. In a device of the class described, the combination of a ferrule having a tapered socket and adapted to be secured to a handle, a shank provided with a wedge-shaped portion for engaging the tapered socket of the ferrule, and a coupling member for connecting the ferrule and the shank and for drawing the same together.

2. In a device of the class described, the combination of a ferrule provided with a tapering socket and having threads, a threaded shank having a wedge-shaped portion for engaging the tapering socket of the ferrule, and a coupling sleeve or nut provided with threads engaging those of the ferrule and the shank.

3. In a device of the class described, the combination of a ferrule having a thickened outer portion provided with a tapering polygonal socket, a shank having a polygonal wedge-shaped portion fitting in the socket of the ferrule, and a coupling member connecting the ferrule and the shank.

4. In a device of the class described, the combination of an exteriorly-threaded ferrule having a thickened portion provided with a tapering polygonal socket, a threaded shank having a polygonal wedge-shaped portion fitting in the socket of the ferrule, and a coupling sleeve or nut receiving the ferrule and the shank and provided with threads for engaging the same.

5. In a device of the class described, the combination of a ferrule provided with a tapered socket having a polygonal inner portion, and a rounded outer portion, a shank having a wedge provided with polygonal and rounded portions to fit the corresponding portions of the socket, and a coupling member connecting the ferrule and the shank.

6. In a device of the class described, the combination of a ferrule having a socket, a shank having a shoulder and provided with a reduced wedge-shaped portion for engaging the socket, a coupling member for connecting the ferrule and the shank and for drawing the same together, and one or more washers arranged on the reduced wedge-shaped portion and interposed between the shoulder of the shank and the ferrule.

7. In a device of the class described, the combination of a ferrule having a socket exteriorly threaded, a shank also having exterior screw-threads and provided with a wedge for engaging the socket, and an interiorly-threaded coupling-sleeve connecting the ferrule and the shank and engaging the screw-threads thereof, said sleeve being provided with a groove forming a smooth unthreaded portion interposed between the threads of the sleeve.

In testimony that I claim the foregoing as my own I have hereto affixed my signature in the presence of two witnesses.

JOSEPH DUCRET.

Witnesses:
WILLIAM J. DAVIS,
JOHN GRAY.